United States Patent [19]

Townsend

[11] Patent Number: 5,011,454
[45] Date of Patent: Apr. 30, 1991

[54] BLADE ATTACHMENT FOR MEAT SKINNING MACHINES

[75] Inventor: Ray T. Townsend, Des Moines, Iowa

[73] Assignee: Townsend Engineering Company, Des Moines, Iowa

[21] Appl. No.: 423,849

[22] Filed: Oct. 19, 1989

[51] Int. Cl.[5] .......................... A22B 5/16; A22C 17/12
[52] U.S. Cl. ....................................... 452/125; 99/589
[58] Field of Search ............... 17/21, 50; 99/584, 588, 99/589

[56] References Cited

U.S. PATENT DOCUMENTS

| | | | |
|---|---|---|---|
| 3,184,785 | 5/1965 | Wezel | 17/21 |
| 3,324,915 | 6/1967 | Townsend | 17/21 |
| 3,703,199 | 11/1972 | Townsend | 99/589 |
| 3,742,841 | 7/1973 | Beasley | 99/589 |
| 4,433,453 | 2/1984 | Leining | 17/21 |
| 4,606,093 | 8/1986 | Townsend | 17/21 |
| 4,811,459 | 3/1989 | Townsend | 17/21 |

FOREIGN PATENT DOCUMENTS 1293636  4/1969  Fed. Rep. of Germany .

Primary Examiner—Willis Little
Attorney, Agent, or Firm—Zarley, McKee, Thomte, Voorhees & Sease

[57] ABSTRACT

The meat skinning machine of this invention comprises the conventional components of a frame with a rotatably powered gripping roll having a cylindrical peripheral surface mounted thereon. A plurality of gripping teeth are formed on the peripheral surface of the gripping roll. An elongated blade holding means is mounted on the frame and extends parallel to the gripping roll and is positioned closely adjacent thereto. An elongated blade is secured to the blade holding means, with the blade having a forward edge portion protruding from the blade holding means and terminating in an elongated sharp cutting edge. The cutting edge of the blade is closely adjacent the teeth on the gripping roll. An elongated plate is on the blade holding means either as an integral part or an attachment thereto. The plate has a forward edge and an upper surface. The forward edge of the plate comprises a shoulder extending along the blade and being closely spaced rearwardly from the cutting edge of the blade to hold meat passing rearwardly thereover up and away from the teeth of the gripping roll as any membrane or skin on the meat is severed from the meat by the cutting edge of the blade. The plate can comprise a plurality of forwardly extending spaced teeth having outer spaced tips with the forward most portions of the tips collectively comprising the shoulder and forward edge of the plate.

1 Claim, 2 Drawing Sheets

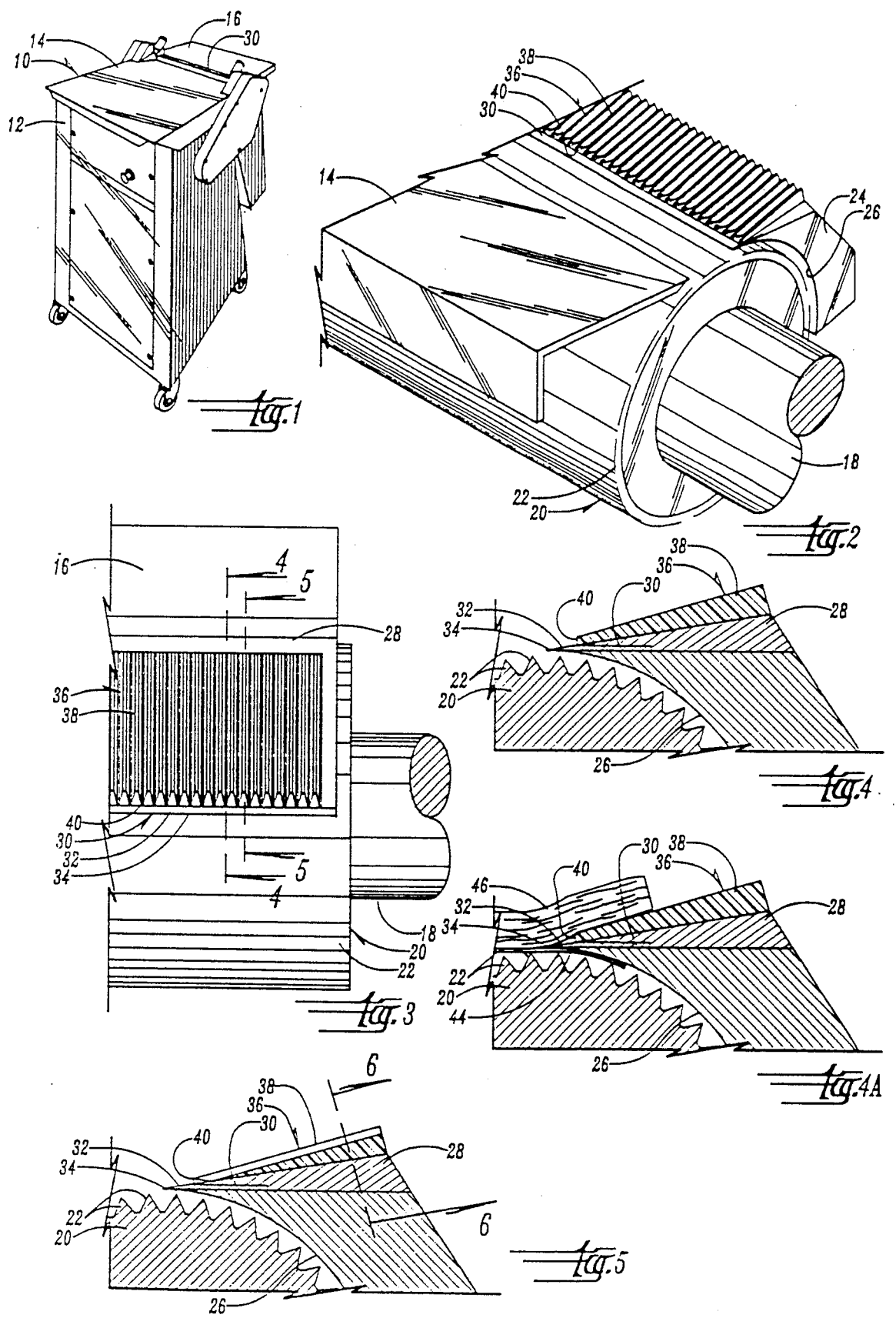

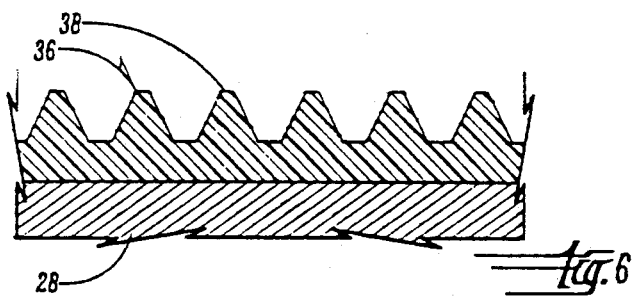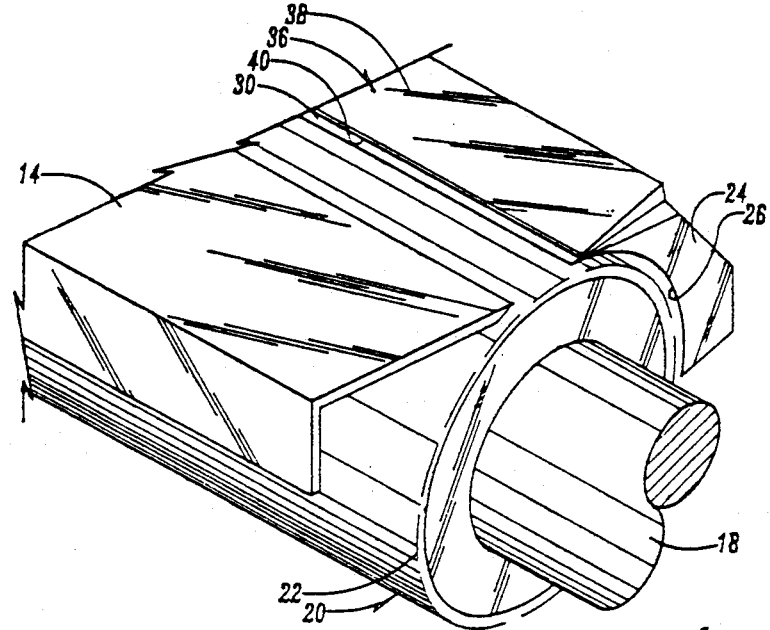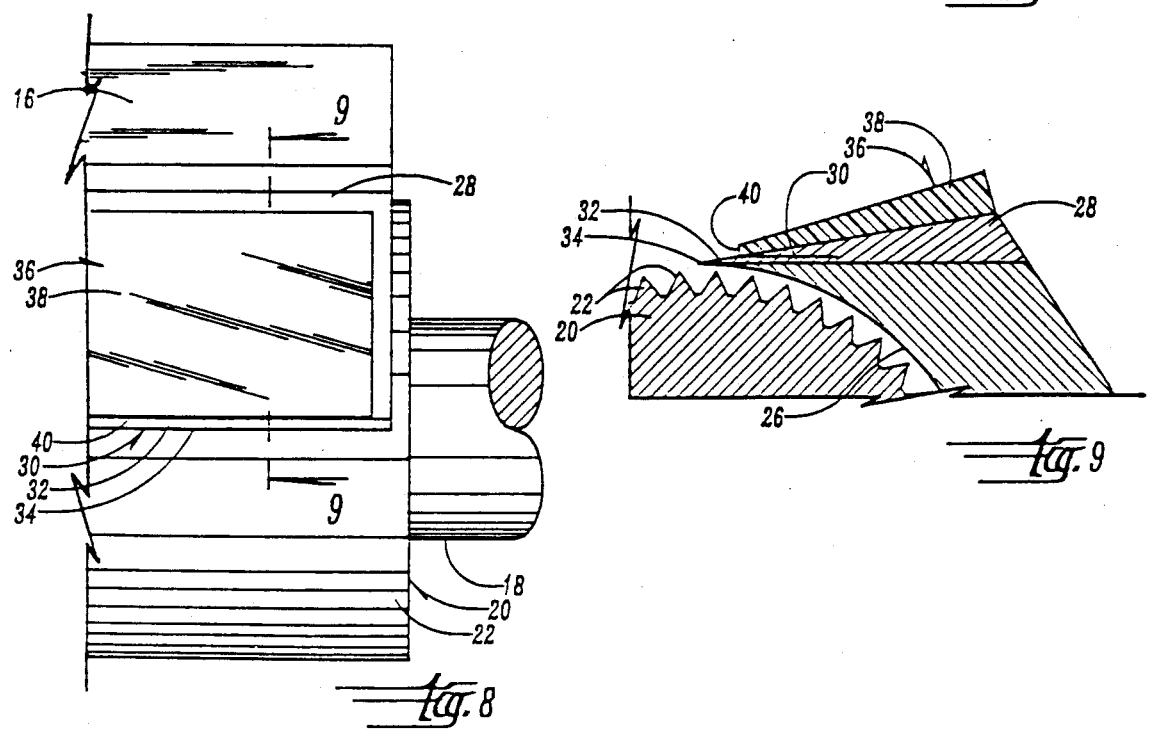

BLADE ATTACHMENT FOR MEAT SKINNING MACHINES

BACKGROUND OF THE INVENTION

Skinning machines for meat, poultry and fish products normally comprise an elongated blade mounted over a gripping roll having a plurality of teeth. The blade is held in a shoe means having an interior arcuate surface complimentary in shape to the outer periphery of the teeth on the gripping roll. As the meat product is moved against the blade, the skin is severed from the meat product and passes between the gripping roll and the shoe. The skinned meat product passes above and over the blade.

A problem has plagued the meat skinning operations described above, and that problem results from the teeth of the gripping roll either damaging the meat product during the skinning operation, or sometimes causing a portion of the meat product to also be severed along with the skin. It should be understood that often the skin or membrane does not continuously cover the meat product, and in certain instances, substantial portions of meat without any skin or membrane thereon pass over the skinning blade. Scoring of this meat by the teeth of the gripping roll is very detrimental, particularly to chicken.

Therefore, a principal object of this invention is to provide a blade attachment for meat skinning machines that will cam the meat product upwardly and over the blade while the skin or membrane on the meat product is being separated and pulled between the blade and the gripping roll whereupon the meat product is protected from the teeth of the gripping roll and whereupon the meat product is not scored and is safeguarded from having portions thereof severed by the skinning blade.

This and other objects will be apparent to those skilled in the art.

SUMMARY OF THE INVENTION

The meat skinning machine of this invention comprises the conventional components of a frame with a rotatably powered gripping roll having a cylindrical peripheral surface mounted thereon. A plurality of gripping teeth are formed on the peripheral surface of the gripping roll. An elongated blade holding means is mounted on the frame and extends parallel to the gripping roll and is positioned closely adjacent thereto. An elongated blade is secured to the blade holding means with the blade having a forward edge portion protruding from the blade holding means and terminating in an elongated sharp cutting edge. The cutting edge of the blade is closely adjacent the teeth on the gripping roll.

An elongated plate is on the blade holding means either as an integral part or an attachment thereto. The plate has a forward edge and an upper surface. The forward edge of the plate comprises a shoulder extending along the blade and being closely spaced rearwardly from the cutting edge of the blade to hold meat passing rearwardly thereover up and away from the teeth of the gripping roll as any membrane or skin on the meat is severed from the meat by the cutting edge of the blade. The plate can comprise a plurality of forwardly extending spaced teeth having outer spaced tips with the forward most portions of the tips collectively comprising the shoulder and forward edge of the plate.

BRIEF DESCRIPTION OF THE DRAWINGS

FIG. 1 is a perspective view of the skinning machine of this invention;

FIG. 2 is an enlarged scale partial perspective view of the gripping roll, the cutting blade, and the blade attachment;

FIG. 3 is a plan view of the device of FIG. 2;

FIG. 4 is a partial sectional view taken on line 4—4 of FIG. 3;

FIG. 4A is a sectional view similar to that of FIG. 4;

FIG. 5 is a partial sectional view similar to that of FIG. 4 but taken on line 5—5 of FIG. 3;

FIG. 6 is an enlarged scale sectional view taken on line 6—6 of FIG. 5;

FIG. 7 is a partial perspective view similar to that of FIG. 2 but shows an alternate form of blade attachment;

FIG. 8 is a plan view of the device of FIG. 7; and

FIG. 9 is a partial sectional view taken on line 9—9 of FIG. 8.

DESCRIPTION OF THE PREFERRED EMBODIMENT

The numeral 10 designates a conventional meat skinning machine upon which the blade attachment of this invention is mounted. It should be noted that for purposes of this description, the term "meat" shall include not onlY meat products but poultry and fish products as well.

Meat skinning machine 10 comprises frame 12 having an upper table 14 thereon which is closely spaced from a feed support bracket 16. A powered shaft 18 is mounted on the frame and supports gripping roll 20 which has a plurality of sharp teeth 22 mounted on its outer cylindrical periphery.

A conventional shoe 24 has a lower arcuate surface 26 which is complimentary in shape to the outer peripheral surface of the gripping roll 20. A blade holder 28 is secured to shoe 24 and supports an elongated flat blade 30. Blade 30 has a forward edge portion 32 which is normally tapered to terminate in an elongated sharp cutting edge 34.

The aforementioned structure constitutes conventional components, and this structure does not of itself constitute the invention herein.

The improvement of this invention is the blade attachment 36 which is an elongated plate secured to the upper surface of blade holder 28 by adhesive or the like. Plate 36 has an upper surface 38 and a forward edge or shoulder 40 which is substantially vertically disposed at right angles to the cutting blade 30.

In operation, (see FIG. 4A) the meat product is moved towards the blade 30. The teeth of the gripping roll grasp the skin or membrane 44 which is severed from the lean meat 46. The severed membrane is pulled by the gripping roll underneath the shoe 24 along the lower arcuate surface 26 thereof. This phenomenon is conventional in existing meat skinning machines.

However, as the lean or skinned meat 46 moves upwardly over the protruding edge 32 of blade 30, it engages the shoulder 40 of plate 36. Shoulder 40 tends to lift or cam the lean meat above the gripping roll. This caming action minimizes if not eliminates the scoring of the meat by the teeth of the gripping roll, and also serves to prevent the lean meat from being drawn into contact with the cutting edge of the blade to cause portions thereof to be severed.

It is therefore seen that this invention not only enhances the quality of the skinned meat product, but it also serves to increase the yield of lean meat by preventing portions of the lean meat from being severed by the skinning blade.

I claim:

1. A meat skinning machine, comprising, a frame, a rotatably powered gripping roll having a cylindrical peripheral surface on said frame, a plurality of meat gripping teeth on the peripheral surface of said gripping roll, an elongated blade holding means on said frame extending parallel to said gripping roll and being positioned closely adjacent thereto, an elongated blade secured to said blade holding means, said blade having a forward edge portion protruding from said blade holding means and terminating in a sharp cutting edge which is closely adjacent the teeth on said gripping roll, an elongated shoulder on said blade holding means, said shoulder being comprised of a plurality of forwardly extending spaced teeth, said shoulder being a plate of solid continuous construction, said plate having a base portion of solid construction with said spaced teeth being formed on the upper surface of said base portion, said base portion having an inner edge, with said spaced teeth having outer spaced tips extending beyond said inner edge, with the forwardmost portions of said tips collectively comprising the forward edge of said plate, said shoulder extending along said blade and being closely spaced rearwardly from said cutting edge of said blade to hold meat passing rearwardly thereover up and away from the teeth of said gripping roll as any membrane on said meat is severed from said meat by said cutting edge.

* * * * *